Patented May 26, 1953

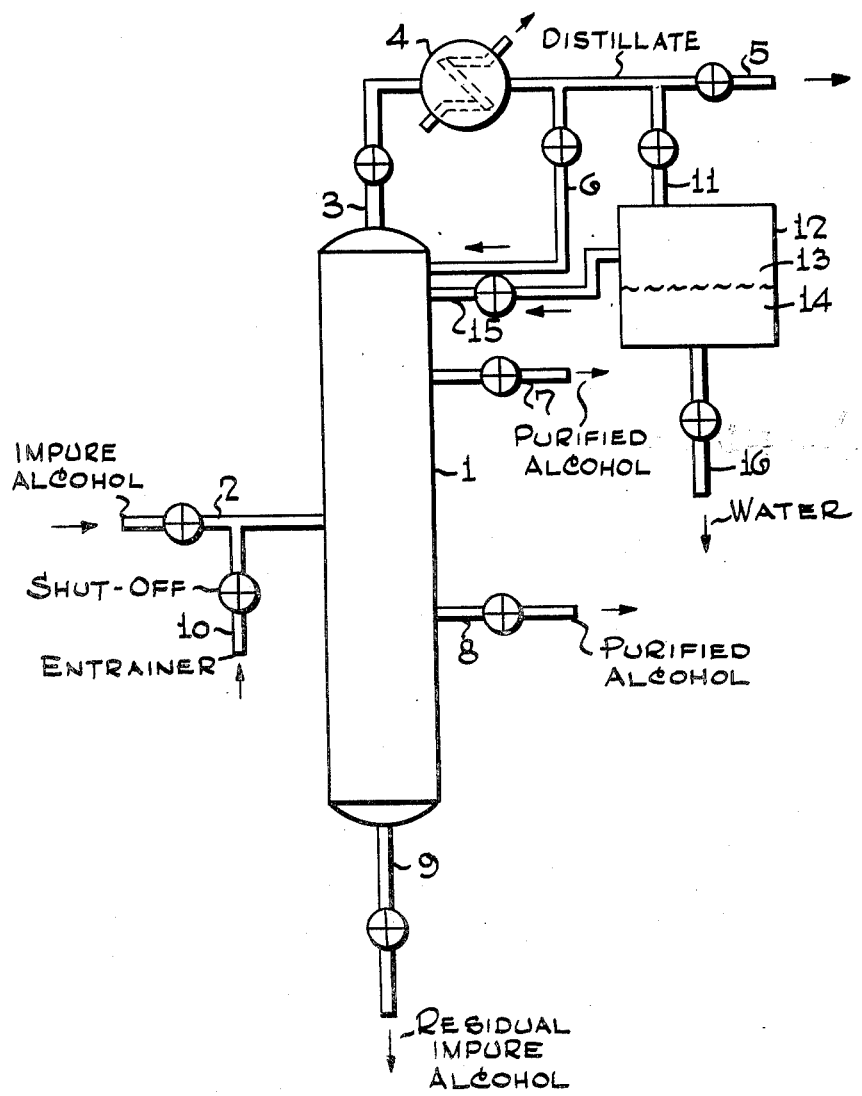

2,640,017

UNITED STATES PATENT OFFICE 2,640,017

PRODUCTION OF SUBSTANTIALLY PURE AND ANHYDROUS ALCOHOLS BY DISTILLATION

Alvin R. Graff, Westfield, N. J., assignor to Standard Oil Development Company, a corporation of Delaware Application July 14, 1949, Serial No. 104,693

5 Claims. (Cl. 202—42)

This invention relates to a method for removing water from alcohol-water solutions. The invention also relates to the production of anhydrous alcohols of higher purity.

The present art of producing an anhydrous alcohol consists of feeding to a fractionation zone an alcohol-water mixture equivalent to or somewhat richer in alcohol than the binary alcohol-water azeotrope, distilling overhead the water in the form of a binary or ternary azeotrope, and recovering anhydrous alcohol from the bottom of the fractionation zone.

It has now been found that an anhydrous alcohol of improved yield and quality is obtained in the fractionation of an impure water-containing alcohol by removing the alcohol product stream at some point above the bottom of the column rather than at the bottom of the finishing column. The anyhydrous alcohol taken as a sidestream rather than a bottom cut is of superior quality free of materials giving rise to objectionable odors including high-boiling impurities which leave the column as a bottoms stream. The exact point of withdrawal of the sidestream product depends upon (1) the strength and quality of the feed; (2) the location of the feed point to the fractionation column; (3) the efficiency of the fractionation column, and (4) the strength and quality of the product.

The invention is illustrated by the attached drawing in which the single figure represents in elevational view one type of apparatus adapted for carrying out the process. Referring to the figure the numeral 1 represents a fractional distillation zone to which the impure alcohol-water mixture is fed at an intermediate point via line 2. The column 1 is provided with heating means (not shown) such as direct or indirect steam to effect the necessary distillation. The feed, in the absence of a water entrainer, must contain more alcohol than is present in the alcohol-water binary azeotrope in order to accomplish the necessary dehydration of the alcohol. During the distillation the water is removed overhead in the form of the alcohol-water binary azeotrope via line 3, condensed in condenser 4 and removed from the system via line 5. Conventional reflux is supplied via line 6. The product consisting of substantially pure anhydrous alcohol is removed from column 1 as a top-sidestream via line 7 or as a lower sidestream 8 below the feed plate. Impurities comprising high-boiling hydrocarbons are removed as a liquid residue from the bottom of the column via line 9. Only small amounts of alcohol are allowed to leave the column via line 9 as are required to keep the bottoms residue fairly fluid.

When it is desired to dehydrate and purify an off-quality impure alcohol containing more water than the alcohol-water binary a suitable water-entraining agent may be employed. These entraining agents and their use are well known in the alcohol dehydration art. Typical entrainers are benzene, ethyl ether, isopropyl ether, diisobutylene, etc. The entrainer employed may be one which forms a binary azeotrope with the water, or a ternary azeotrope with the alcohol and water.

Referring to the drawing the entrainer is added to the system via line 10. Sufficient entrainer should be employed to remove all of the water present in the feed. The aqueous vapor containing the entrainer and/or alcohol is removed overhead via line 3, condensed in condenser 4, and passed via line 11 to separator 12 wherein the condensed liquid separates into an entrainer-rich phase and a water-rich phase. Since the usual entrainers are normally lighter than water the upper phase 13 will be designated as the entrainer-rich phase while the lower phase 14 will be designated as the water-rich phase. The water-rich phase is withdrawn from the system via line 16 while the upper entrainer-rich phase is returned to fractionation zone 1 as reflux via line 15. As in the previous case the purified anhydrous product is withdrawn as an upper sidestream 7 or a lower sidestream 8.

It has been found that, when feeding an off-quality impure 99% isopropanol to produce pure anhydrous isopropanol, the product is preferably taken as an upper sidestream, i. e., from a plate above the feed plate to the fractionation zone. Whereas, when a similar off-quality 95% isopropanol is fed to the fractionation zone it is preferred to remove the pure anhydrous product as a lower sidestream, i. e., from a plate below the feed plate to the fractionation column. This phenomenon is explained by the fact that when distilling a 95 volume percent alcohol the concentration of alcohol above the feed plate decreases as the vapor ascends the column so that the overhead will have the composition of the water binary azeotrope as long as there is any water in the column. On the other hand when distilling a 99 volume percent alcohol only a small amount of water must be removed and the alcohol concentration is fairly constant all through the column until at the very top it reaches 91 to 95 volume percent which is the approximate composition of the overhead stream.

Example I

An off-quality 99.0 volume percent (about 98.5 weight percent) isopropanol (i. e. isopropanol containing 1 volume percent (about 1.0 weight percent) $H_2O$ and traces or less than 0.5 volume percent (less than about 0.5 weight percent) high-boiling impurities) was fed to the 20th plate of a 54-plate distillation column at a rate of 7.5 gallons/hour. An overhead stream of 0.29 gal./hr. comprising 91 to 96 volume percent (about 88 to 93 weight percent) isopropanol and the water was taken; and a bottoms residual product of impure 99%+ by weight anhydrous isopropanol was recovered at a rate of 0.01 gal./hr. The alcohol from both these points had a bad odor. An isopropanol product was withdrawn at the 24th plate at a rate of 7.2 gals./hr. This alcohol was of 99.4+ volume percent strength and possessed a very good odor. The quality of the alcohol was also superior to the bottoms product obtained by customary distillation as determined by optical density at 2250 Å and 2700 Å. (which are indications of the content of high-boiling hydrocarbon bodies and of ketones respectively). An alcohol taken from the 33rd plate during a similar distillation was even superior to the alcohol taken from the 24th plate of the same column.

Example II

An off-quality 95 volume percent (about 92.5 weight percent) isopropanol was purified and dehydrated in a series of runs, in a 50 plate commercial fractionation zone. The alcohol was fed to the 40th plate. The alcohol contained 4.5 to 5.0 volume percent (about 7 to 7.5 weight percent) water and from 0.5 volume per cent (about 0.5 weight percent) to traces of high-boiling impurities. The optical density of the feed was high, varying from 0.5 to 2.0+ at 2250 Å. The sidestream products were taken continuously from plates below the feed plate. All products were of 99.4+ volume percent isopropanol, of good odor and possessed the following optical density measurements as compared with the bottoms product taken from the customary distillation.

| Point of Product Withdrawal | Optical Density | | | | | |
|---|---|---|---|---|---|---|
| | Run No. 1 | | Run No. 2 | | Run No. 3 | |
| | 2,250 Å. | 2,700 Å. | 2,250 Å. | 2,700 Å. | 2,250 Å. | 2,700 Å. |
| Plate 5 | 0.162 | 0.036 | 0.177 | 0.012 | 0.169 | 0.011 |
| Plate 10 | 0.221 | 0.054 | 0.214 | 0.036 | 0.216 | 0.029 |
| Plate 15 | 0.285 | | 0.112 | 0.013 | 0.157 | 0.008 |
| Plate 21 | 0.277 | 0.068 | 0.250 | 0.061 | 0.216 | 0.024 |
| Bottoms | 0.391 | 0.087 | 0.227 | 0.018 | 0.298 | 0.038 |

Example III

Secondary butanol was continuously dehydrated and purified in a 54-plate fractionation column with the feed entering at the 20th plate. The feed analysis showed 92.2 weight percent secondary butanol; 7.3 to 7.8 weight percent water, and 0.5 weight percent to traces of high-boiling impurities. The optional density ranged from 2 to 2+. The feed was of poor odor. After distillation a dry product (99.4+ weight percent secondary butanol) of good odor was obtained. The following data from two continuous runs showing the optical density of various product streams demonstrate the advantage of removing the product as a sidestream rather than as bottoms.

RUN NO. 1

| Product Withdrawal Point | Optical Density at 2,250 Å. | | | | | | | |
|---|---|---|---|---|---|---|---|---|
| | Sample 1 | Sample 2 | Sample 3 | Sample 4 | Sample 5 | Sample 6 | Sample 7 | Sample 8 |
| Bottoms | 2+ | 2+ | 2+ | 2+ | 2+ | 2+ | 2+ | 2+ |
| Plate 2 | 2+ | 2+ | | | | | | |
| Plate 4 | 2+ | | | | | | | 0.800 |
| Plate 6 | 1.300 | | | 0.357 | 0.520 | 0.612 | 0.750 | 0.675 |
| Plate 8 | 0.745 | 0.720 | 0.410 | 0.353 | 0.425 | 0.505 | 0.890 | 0.795 |
| Plate 12 | | 0.620 | 0.593 | 0.530 | 0.495 | 0.512 | 0.930 | 0.830 |
| Plate 14 | | 0.655 | 0.502 | 0.490 | 0.618 | | | |

RUN NO. 2[1]

| | Sample 1 | Sample 2 | Sample 3 | Sample 4 | | | | |
|---|---|---|---|---|---|---|---|---|
| Plate 12 | 1.20 | .442 | .412 | .390 | | | | |
| Plate 8 | .315 | .390 | .425 | .355 | | | | |
| Plate 6 | .390 | .500 | .510 | .430 | | | | |
| Plate 4 | .435 | .595 | .625 | .565 | | | | |
| Bottoms | 2+ | 2+ | 2+ | 2+ | | | | |

[1] O. D. of crude secondary butyl alcohol—1.053 @ 2,250 Å.

It is realized that in the alcohol purification art alcohol products have been taken as sidestream from the fractionation column. For example in the concentration of aqueous isopropanol (40–60 volume percent IPOH) as manufactured commercially the alcohol product is taken as a top sidestream from the concentrating column. But in this instance the alcohol product is one of binary azeotropic composition, i. e., 91 volume percent IPOH-9 volume percent $H_2O$. In the production of anhydrous alcohols it is customary to remove water overhead and recover anhydrous alcohol as a bottoms product and it has not been realized previously that a product of greater purity can be obtained by taking the anhydrous alcohol product as a sidestream rather than a bottoms residue. In some distillations the product purity as obtained in the process of this invention is accompanied by a loss of a few tenths of a volume present in dehydration effect. For example, in a given distillation on an impure feed stock it is possible to recover 100% alcohol free of water as a bottoms product, however, the alcohol has a poor odor and its optical density at 2250 Å. is high, i. e., 0.75 to 1.0+. On the other hand a 99.8 volume percent alcohol of 0.1 to 0.3 optical density at 2250 Å. can be obtained from the same feed stock in the same column by removing the alcohol product as a sidestream either below or above the feed plate rather than recover it from the bottom of the column. This alcohol possesses good odor and is marketable whereas the bottoms product, although completely dry, is not and must be further treated for odor improvement.

The invention is generally applicable to the production of any anhydrous substantially water-soluble alcohol, e. g., those alcohols containing from 2 to 5 carbon atoms per molecule from impure alcohols containing more alcohol than is present in the alcohol-water binary azeotrope. Such binary compositions are as follows:

| Alcohol | Wt. Percent Alcohol | Wt. Percent H$_2$O |
|---|---|---|
| Ethanol | 95.57 | 4.43 |
| n-propanol | 71.69 | 28.31 |
| isopropanol | 87.90 | 12.10 |
| sec-butanol | 68 | 32 |
| isobutanol | 66.8 | 33.2 |
| t-butanol | 88.24 | 11.76 |
| n-butanol | 62 | 38 |
| t-amyl alcohol | 72.5 | 27.5 |
| pentanol-2 | 61.5 | 38.5 |
| pentanol-3 | 64 | 36 |
| n-amyl alcohol | 46 | 54 |

The process is also applicable as previously explained to the above alcohols containing less alcohol than contained in the binary azeotrope with water provided sufficient entraining agent is added to the feed mixture to dehydrate the alcohol to a water content at least just below the alcohol-water binary composition.

What is claimed is:

1. In the production of substantially pure and anhydrous alcohol selected from the class consisting of ethanol, isopropanol, and secondary butanol from a crude feed stock containing the alcohol, between 0.5 and 7.8 weight per cent water but a minor fraction of the water contained in the alcohol-water binary azeotrope of the alcohol and containing from between a trace and 0.5 weight per cent of high boiling hydrocarbon impurities, which comprises feeding a stream of said crude alcohol feed stock continuously into an intermediate point of a fractionation zone, continuously distilling overhead from said fractionation zone the water with at least as much of the alcohol as contained in the alcohol-water binary azeotrope in the absence of a water entrainer and in the absence of salt-forming compounds, continuously removing said high-boiling impurities in a residual bottoms product of at least about 99 weight per cent of said alcohol, and continuously removing a major amount of the alcohol as an intermediate side stream from said fractionation zone wherein the said alcohol is a pure anhydrous product.

2. A process for the production of substantially pure and anhydrous isopropanol from an impure isopropanol containing 92.5 to 99 weight per cent isopropanol, 0.5 to 7.5 weight per cent of water and traces to 0.5 weight per cent of high-boiling hydrocarbon impurities which comprises continuously feeding a stream of said impure alcohol to a fractionation zone at an intermediate point thereof, continuously distilling the isopropanol with the water in the absence of an entrainer and in the absence of salt-forming compounds to remove overhead continuously the distillation containing the water with from 88 to 93 weight per cent isopropanol, continuously removing the high-boiling impurities as bottoms containing at least about 99 weight per cent anhydrous isopropanol, and continuously removing substantially pure and anhydrous isopropanol as a side stream from the fractionation zone.

3. A process according to claim 2 in which the impure isopropanol feed stream contains about 98.5 weight per cent isopropanol, 1 weight per cent water and a trace to 0.5 weight per cent of the high-boiling impurities, and in which the substantially pure and anhydrous isopropanol product side stream is removed at a point above the feed point of the fractionation zone.

4. A process according to claim 2 in which the impure isopropanol contains about 92.5 weight per cent isopropanol, about 7.5 weight per cent water, and a trace to 0.5 weight per cent of the high-boiling impurities, and in which said side stream is removed at a point below the intermediate feed point of the fractionation zone.

5. A process for the production of substantially anhydrous secondary butanol from an impure secondary butanol containing about 92.2 weight per cent secondary butanol, 7.3 to 7.8 weight per cent water and a trace to 0.5 weight per cent of high-boiling hydrocarbon impurities which comprises continuously feeding a stream of said impure secondary butanol to an intermediate feed point of a fractionation zone, continuously distilling overhead from the fractionation zone the water with at least an azeotropic proportion of the secondary butanol in the absence of an entrainer and in the absence of salt-forming substances, continuously removing the high-boiling impurities in a bottoms product containing about 99 weight per cent secondary butanol from the fractionation zone, and continuously withdrawing a major portion of the secondary butanol as a side stream in substantially pure and anhydrous condition.

ALVIN R. GRAFF.

References Cited in the file of this patent
UNITED STATES PATENTS

| Number | Name | Date |
|---|---|---|
| 1,394,232 | Stevens | Oct. 18, 1921 |
| 1,831,425 | Ricard | Nov. 10, 1931 |
| 1,911,832 | Lewis | May 30, 1933 |
| 2,192,489 | Rosebaugh | Mar. 5, 1940 |
| 2,392,534 | Von Keussler | Jan. 8, 1946 |